United States Patent
Garrisi et al.

(10) Patent No.: US 10,302,374 B2
(45) Date of Patent: May 28, 2019

(54) BAFFLE ASSEMBLY FOR A CHARGE AIR COOLER

(71) Applicant: MAHINDRA VEHICLE MANUFACTURERS LIMITED, Mumbai, Maharashtra (IN)

(72) Inventors: Matthew Garrisi, Canton, MI (US); Vasantha Ganesh Jayasankaran, Rochester Hills, MI (US)

(73) Assignee: MAHINDRA VEHICLE MANUFACTURERS LIMITED, Mumbai (IN)

( * ) Notice: Subject to any disclaimer, the term of this patent is extended or adjusted under 35 U.S.C. 154(b) by 0 days.

(21) Appl. No.: 15/701,896

(22) Filed: Sep. 12, 2017

(65) Prior Publication Data

US 2018/0073822 A1     Mar. 15, 2018

Related U.S. Application Data

(60) Provisional application No. 62/394,669, filed on Sep. 14, 2016.

(51) Int. Cl.
| | | |
|---|---|---|
| *B60K 11/06* | (2006.01) | |
| *F28F 13/06* | (2006.01) | |
| *F02M 35/10* | (2006.01) | |

(52) U.S. Cl.
CPC .............. *F28F 13/06* (2013.01); *B60K 11/06* (2013.01); *F02M 35/10262* (2013.01); *F02M 35/10268* (2013.01); *Y02T 10/146* (2013.01)

(58) Field of Classification Search
CPC ........ B60K 11/04; B60K 11/08; B60K 11/085
(Continued)

(56) References Cited

U.S. PATENT DOCUMENTS

| | | | | | |
|---|---|---|---|---|---|
| 4,141,426 A | * | 2/1979 | Hamada | ................. | B60K 11/04 |
| | | | | | 180/68.4 |
| 4,548,166 A | * | 10/1985 | Gest | ..................... | F02M 35/024 |
| | | | | | 123/198 E |

(Continued)

FOREIGN PATENT DOCUMENTS

| | | |
|---|---|---|
| DE | 102011085074 A1 | 4/2013 |
| DE | 102015119269 A1 | 5/2016 |
| EP | 2574484 A1 | 4/2013 |

OTHER PUBLICATIONS

International Search Report; International App. No. PCT/US2017/051439; dated Jan. 23, 2018; 4 pages.

*Primary Examiner* — Jeffrey J Restifo
(74) *Attorney, Agent, or Firm* — Dickinson Wright PLLC

(57) ABSTRACT

A baffle assembly for directing air to a charge air cooler disposed within an engine compartment and mounted above a radiator module and behind a hood latch support bracket extending between an upper and lower structure of the vehicle frame. The baffle assembly includes a lower baffle for directing air upwardly towards the charge air cooler and an upper baffle for directing air downwardly towards the charge air cooler. An air diverter extends from either the lower or upper baffle for positioning behind the hood latch support bracket to reduce turbulence behind the hood latch support bracket and more uniformly distribute airflow to the charge air cooler. In other words, the air diverter reduces the recirculation region and turbulence by diverting the airflow behind the hood latch support bracket smoothly with minimum air flow losses and improves the mass flow rate through the charge air cooler, therefore significantly improving efficiency.

18 Claims, 7 Drawing Sheets

(58) Field of Classification Search
USPC .............................. 180/68.1, 68.3, 68.4, 68.6
See application file for complete search history.

(56) References Cited

U.S. PATENT DOCUMENTS

| | | | | |
|---|---|---|---|---|
| 4,932,490 | A * | 6/1990 | Dewey | B60K 13/02 180/68.3 |
| 5,219,016 | A * | 6/1993 | Bolton | B60H 1/3227 165/140 |
| 5,267,624 | A * | 12/1993 | Christensen | B60K 11/04 165/98 |
| 5,551,505 | A * | 9/1996 | Freeland | B60K 11/08 165/41 |
| 5,564,513 | A * | 10/1996 | Wible | B60K 13/02 123/198 E |
| 5,660,243 | A * | 8/1997 | Anzalone | B60K 13/02 180/68.1 |
| 5,775,450 | A * | 7/1998 | Porter | B60K 11/02 180/68.1 |
| 6,167,976 | B1 * | 1/2001 | O'Neill | B62D 25/10 123/41.49 |
| 6,540,037 | B2 * | 4/2003 | Sasano | B60K 11/08 180/68.1 |
| 6,729,424 | B2 * | 5/2004 | Joutaki | B62D 25/084 180/311 |
| 6,789,606 | B2 * | 9/2004 | Ohki | B60K 11/04 165/41 |
| 7,234,555 | B2 * | 6/2007 | Khouw | B60K 13/02 180/68.3 |
| 7,237,635 | B2 * | 7/2007 | Khouw | B60K 13/02 180/68.3 |
| 7,469,762 | B2 * | 12/2008 | Kim | B60K 13/02 123/184.57 |
| 7,507,270 | B2 | 3/2009 | Maas et al. | |
| 7,717,204 | B2 * | 5/2010 | Kondou | B60R 19/52 180/68.1 |
| 8,042,635 | B2 * | 10/2011 | Kang | B62D 25/084 180/311 |
| 8,127,878 | B2 * | 3/2012 | Teraguchi | B60K 11/08 180/68.1 |
| 8,256,496 | B2 * | 9/2012 | Shuttleworth | F01P 5/06 123/41.31 |
| 8,365,854 | B2 * | 2/2013 | Lee | B60K 11/00 180/68.1 |
| 8,528,679 | B2 * | 9/2013 | Stuckey | B60K 13/02 180/68.3 |
| 8,708,075 | B2 * | 4/2014 | Maurer | B60R 19/52 180/68.1 |
| 8,783,400 | B2 * | 7/2014 | Hirukawa | F01P 3/18 180/68.1 |
| 9,134,080 | B2 * | 9/2015 | Leonard | B60K 11/08 |
| 9,222,288 | B2 * | 12/2015 | Townson | E05B 79/04 |
| 9,586,625 | B2 * | 3/2017 | Crane | B60K 11/085 |
| 9,644,525 | B2 * | 5/2017 | Bignon | B60K 11/085 |
| 9,751,377 | B2 * | 9/2017 | Kappelman | B60K 11/04 |
| 9,890,688 | B2 * | 2/2018 | Bui | B60K 11/08 |
| 9,902,430 | B2 * | 2/2018 | Sytsma | B60R 19/48 |
| 2008/0142285 | A1 | 6/2008 | McCurdy et al. | |
| 2013/0074410 | A1 * | 3/2013 | Berkeland | B62D 25/12 49/142 |
| 2013/0264133 | A1 | 10/2013 | Remy et al. | |
| 2014/0216834 | A1 | 8/2014 | Elliott et al. | |

* cited by examiner

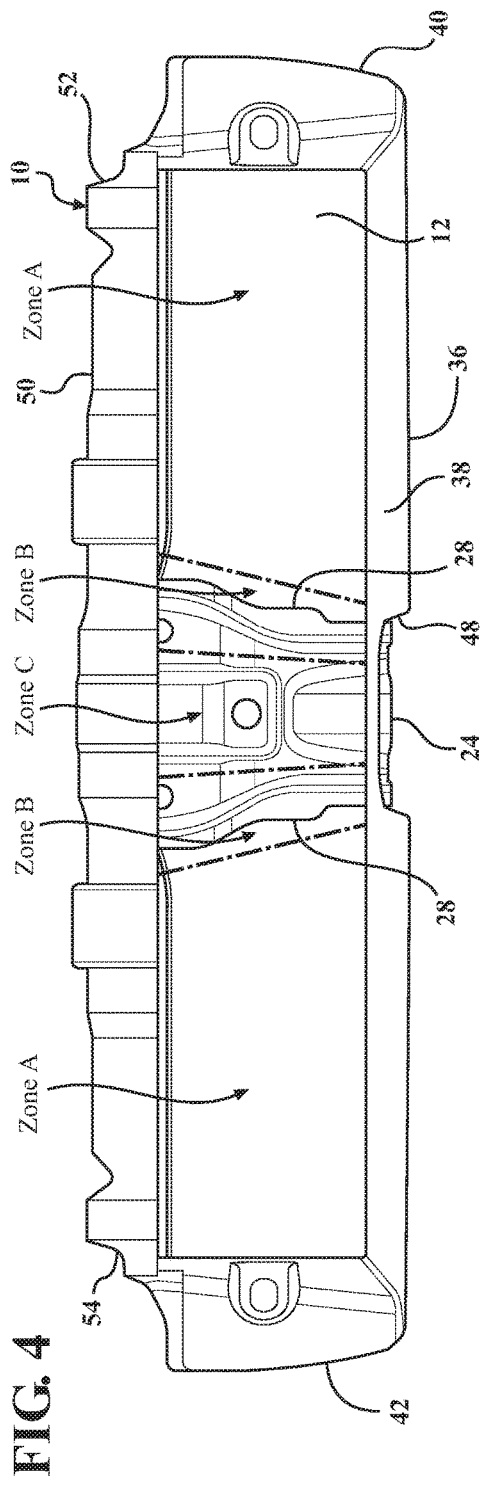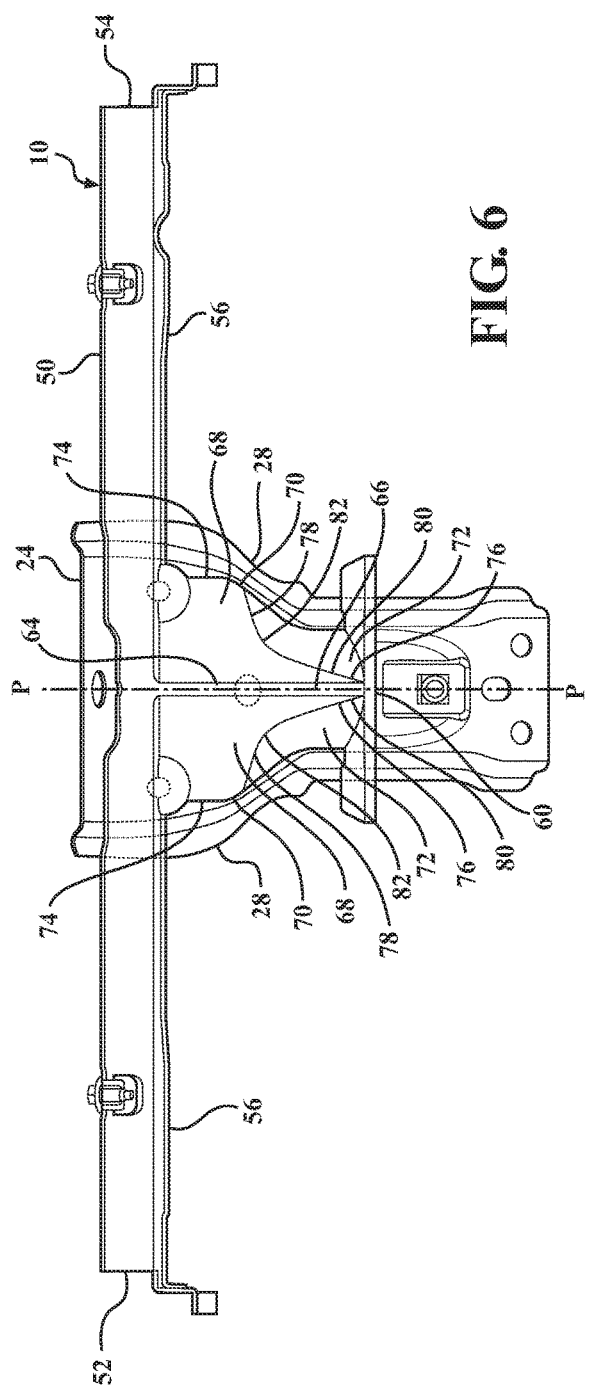

BAFFLE ASSEMBLY FOR A CHARGE AIR COOLER

CROSS REFERENCE TO RELATED APPLICATION

The subject application claims priority to U.S. Provisional Application Ser. No. 62/394,669 filed on Sep. 14, 2016, the entire disclosure of which is incorporated herein by reference.

BACKGROUND OF THE INVENTION

1. Field of the Invention

The subject disclosure relates in general to a baffle assembly for directing airflow to a charge air cooler mounted within a vehicle engine compartment defined by at least an upper structure and a lower structure of a vehicle frame. More specifically, the subject disclosure relates to a baffle assembly for directing air to a charge air cooler mounted above a radiator module and behind a hood latch support bracket that extends between the upper and lower structures of the vehicle frame.

2. Description of the Prior Art

This section provides background information related to the present invention which is not necessarily prior art.

Many internal combustion engines include turbochargers configured to force more air mass into an engine's intake manifold and combustion chamber. However, increased air pressure leads to increased air intake temperatures which reduce any performance gains from turbocharging due to decreased density. Increased air intake temperatures can also increase the cylinder combustion temperature, causing detonation, excessive wear, or heat damage to an engine block or pistons. Accordingly, it is known to use a charge air cooler in conjunction with a turbocharger to compensate for the increased heating caused by turbocharging. Such charge air coolers may be used with both gasoline and diesel engines.

Charge air coolers that exchange their heat directly with the ambient air are designed to be mounted within areas of a vehicle that are exposed to maximum air flow. One such area is near a front body structure beam of the vehicle where it will receive and be exposed to a path of incoming ambient air through a front grille or fascia of the vehicle. In this front-mounted arrangement, the charge air cooler can be placed below a radiator module, on the side of the radiator module, in front of the radiator module, and above or on top of the radiator module. However, when the charge air cooler is placed above or on top of the radiator module, the presence of a hood latch support bracket extending between the upper and lower structures of a vehicle frame can block and restrict the airflow path entering from the front fascia grille and traveling to the charge air cooler. The recirculation and turbulence produced behind this blocking structure (i.e., the hood latch support bracket) distorts the airflow to the charge air cooler, leading to less effectiveness of the charge air cooler because it receives an unevenly distributed airflow at a lower mass flow rate.

Accordingly, there remains a need in the art for an improved baffle assembly for use with a charge air cooler mounted above a radiator module and behind a hood latch support bracket of the vehicle frame.

SUMMARY OF THE INVENTION

This section provides a general summary of the invention and is not intended to be a comprehensive disclosure of its full scope, aspects, objectives, and/or all of its features.

A baffle assembly for directing air to a charge air cooler mounted above a radiator module and behind a hood latch support bracket includes a lower baffle for mounting along and next adjacent the lower structure of the vehicle frame to direct air upwardly towards the charge air cooler. The baffle assembly also includes an upper baffle for mounting along and behind the upper structure of the vehicle frame to direct air downwardly towards the charge air cooler. An air diverter extends from one of the lower or upper baffles for positioning the air diverter behind the hood latch support bracket to reduce turbulence behind the hood latch support bracket and more uniformly distribute airflow to the charge air cooler. In other words, the air diverter moderates a wake or turbulence typically produced behind the hood latch support bracket and diverts the airflow behind the hood latch support bracket to uniformly distribute airflow to the charge air cooler and increase an ambient air mass flow rate of the charge air cooler. Thus, the air diverter advantageously provides the charge air cooler with an optimum ambient air feed that significantly improves the effectiveness of the charge air cooler, and correspondingly the vehicle's fuel economy.

These and other objects, features and advantages of the present invention will become more apparent from the following description

BRIEF DESCRIPTION OF THE DRAWINGS

Other advantages of the present invention will be readily appreciated, as the same becomes better understood by reference to the following detailed description when considered in connection with the accompanying drawings wherein:

FIG. 4 is a magnified, front view of a portion of FIG. 2 illustrating a plurality of airflow zones of the charge air cooler defined relative to the hood latch support bracket;

FIG. 6 is a rear view of a portion of FIG. 4 illustrating the rear end of the air diverter having a trailing central surface and a first and second pair of converging surfaces each being mirror images of one another relative to a plane P defined transverse to the trailing central surface;

DETAILED DESCRIPTION OF THE ENABLING EMBODIMENTS

Example embodiments will now be described more fully with reference to the accompanying drawings. The example embodiments are provided so that this disclosure will be thorough and fully convey the scope to those skilled in the art. Numerous specific details are set forth such as examples of specific components, devices, mechanisms, assemblies, and methods to provide a thorough understanding of various embodiments of the present disclosure. It will be apparent to those skilled in the art that specific details need not be employed, that example embodiments may be embodied in many different forms, and that neither should be construed to limit the scope of the disclosure. With this in mind, the present disclosure is generally directed to a baffle assembly for directing air to a charge air cooler mounted within a vehicle engine compartment above a radiator module.

Figure 1:
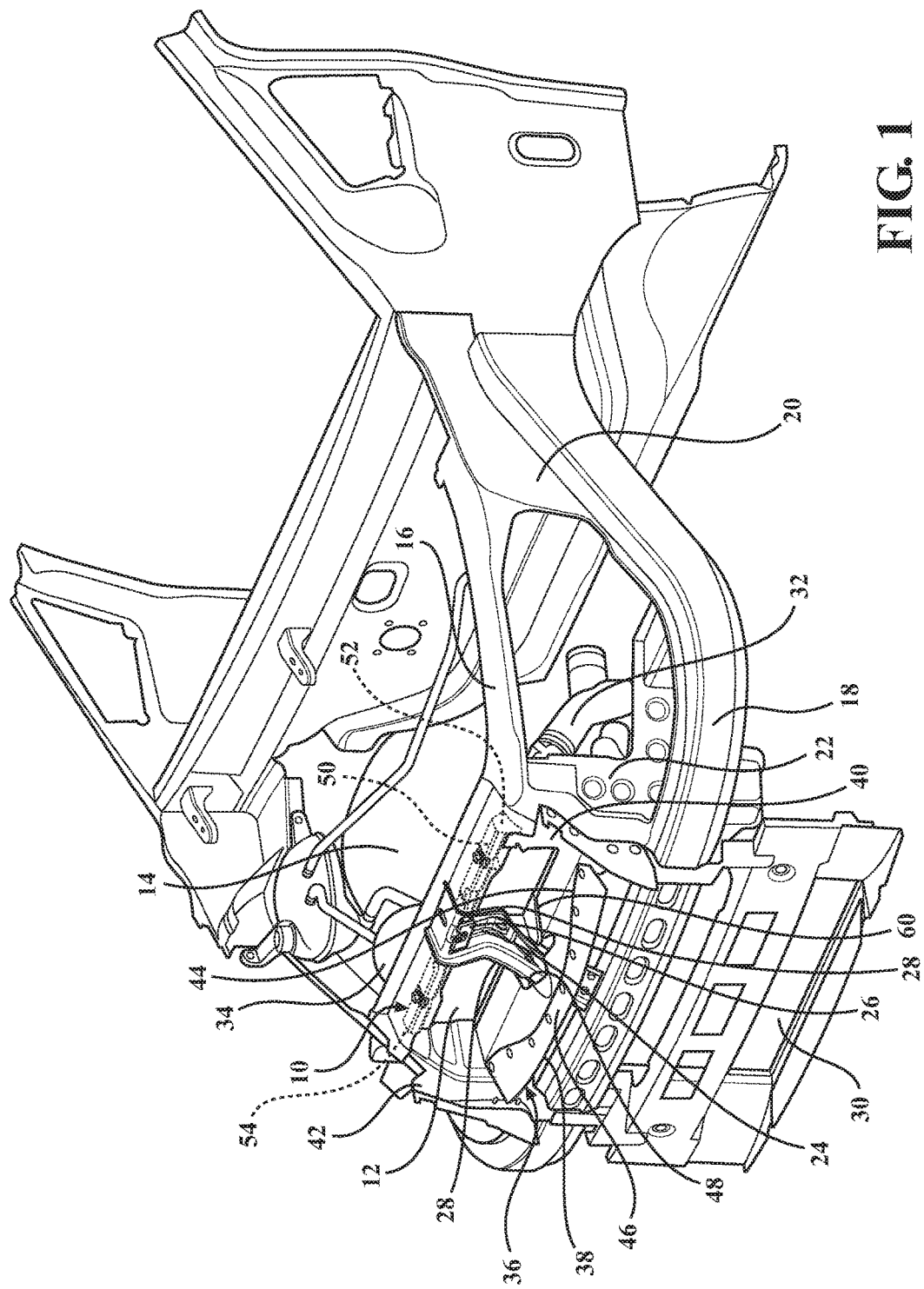
FIG. 1 is a perspective view of a vehicle engine compartment illustrating a charge air cooler mounted behind a hood latch support bracket extending between an upper and lower structure of a vehicle frame.
Figure 2:
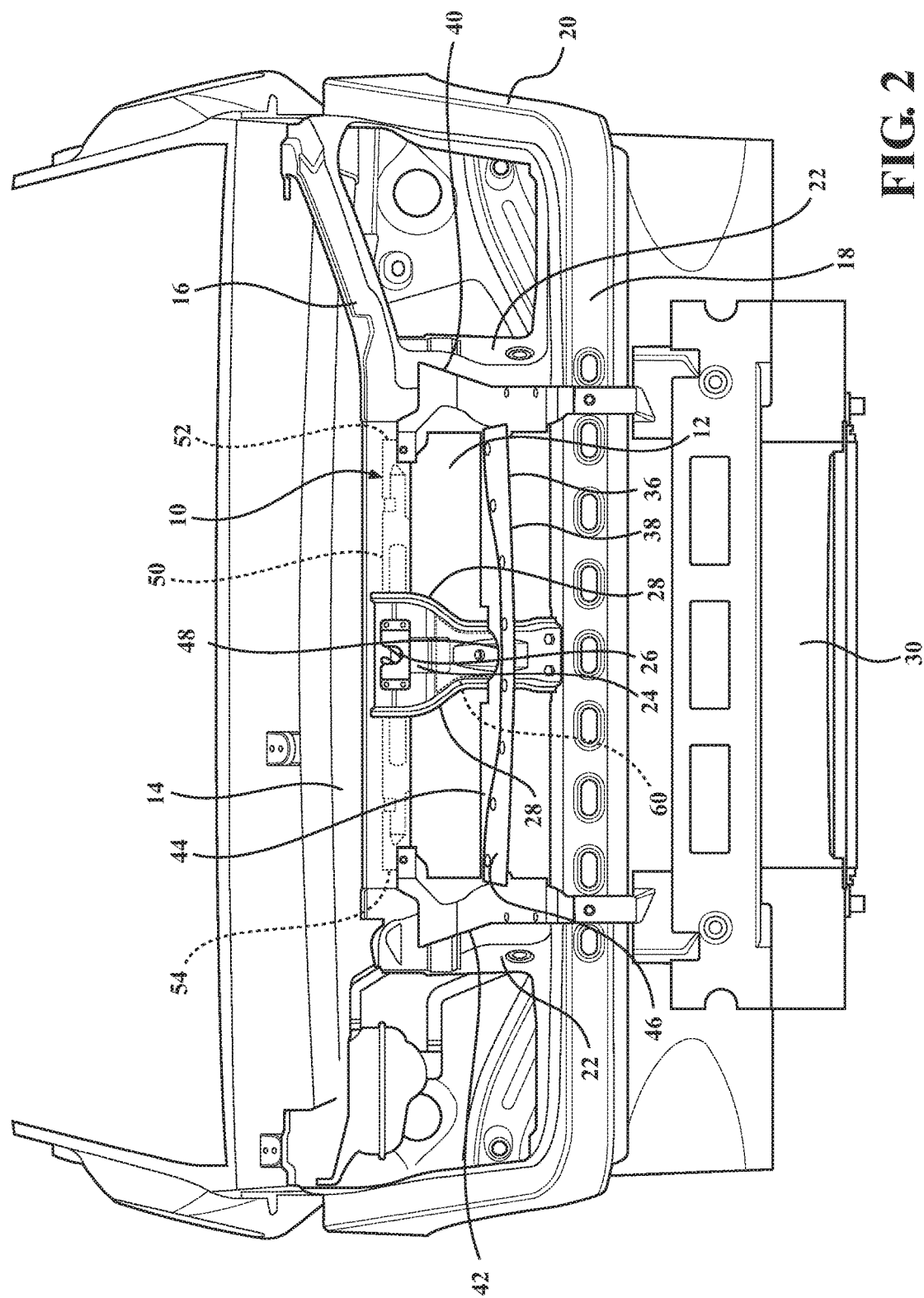
FIG. 2 is a front view of the vehicle engine compartment illustrating the charge air cooler mounted above a radiator module and a baffle assembly including a lower baffle extending along and adjacent the lower structure and an upper baffle extending along and behind the upper structure.

Referring to the Figures, wherein like numerals indicate corresponding parts throughout the several views, a baffle assembly 10 for directing air to a charge air cooler 12 is illustrated in FIGS. 1-6. As best illustrated in FIGS. 1 and 2, the baffle assembly 10 is disposed within an engine compartment 14 defined or bounded by at least an upper structure 16 and a lower structure 18 of a vehicle frame 20. The vehicle frame 20 can also include a pair of side structures 22 extending between the upper and lower structures 16, 18 in spaced and parallel relationship to one another. A hood latch support bracket 24 onto which a hood latch 26 is secured extends between the upper and lower structures 16, 18 of the vehicle frame 20 to define a pair of bracket edges 28. As best illustrated in FIG. 2, the hood latch support bracket is preferably spaced equidistantly between the pair of side structures 22.

Figure 3:
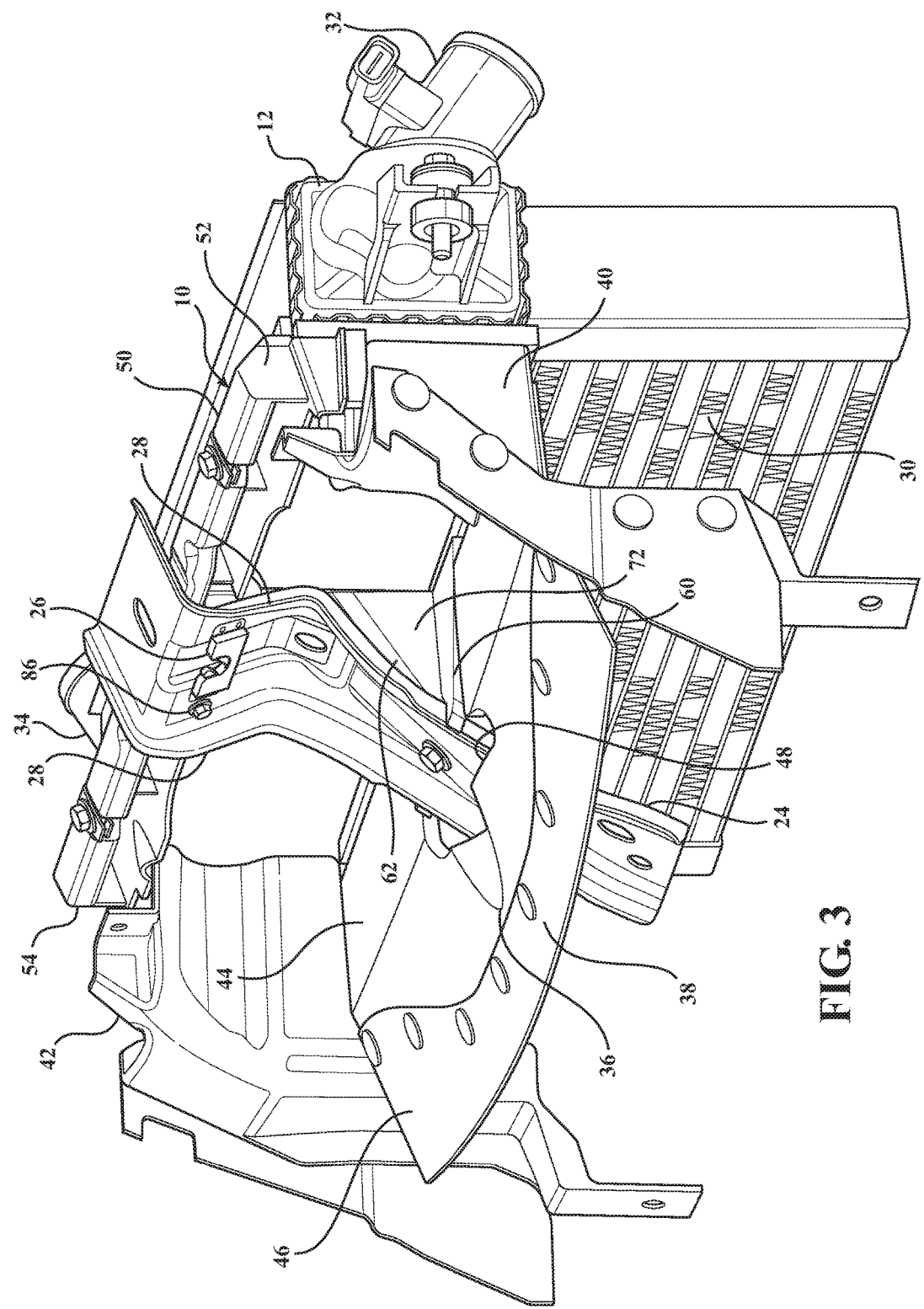
FIG. 3 is a magnified, perspective view of a portion of FIG. 1 illustrating an air diverter extending downwardly from the upper baffle and positioned behind the hood latch support bracket.

As best illustrated in FIGS. 1-3, the charge air cooler 12 is mounted above and on top of a radiator module 30, inclusive of a radiator, condenser, and fan (not individually shown) as is well known in the art, for cooling an engine of the vehicle. The charge air cooler 12 is also disposed directly behind the hood latch support bracket 24. As explained above, the charge air cooler 12 is used in conjunction with a turbocharger (not expressly shown) to compensate for the increased heating of the air delivered to the engine cylinders caused by turbocharging the vehicle engine. Thus, as best illustrated in FIGS. 1 and 3, the charge air cooler 12 includes an air inlet 32 for receiving a compressed air intake from the turbocharger and an air outlet 34 for distributing a cooled, compressed air intake which has passed through the charge air cooler 12 to the vehicle engine. Since the charge air cooler 12 is designed to exchange the heat of the compressed air intake directly with the ambient air (i.e., an air-to-air cooler), the charge air cooler 12 is mounted adjacent a front of the vehicle and within a path of air entering into the engine compartment 14 through a front fascia grille (not expressly shown) of the vehicle.

Figure 5:
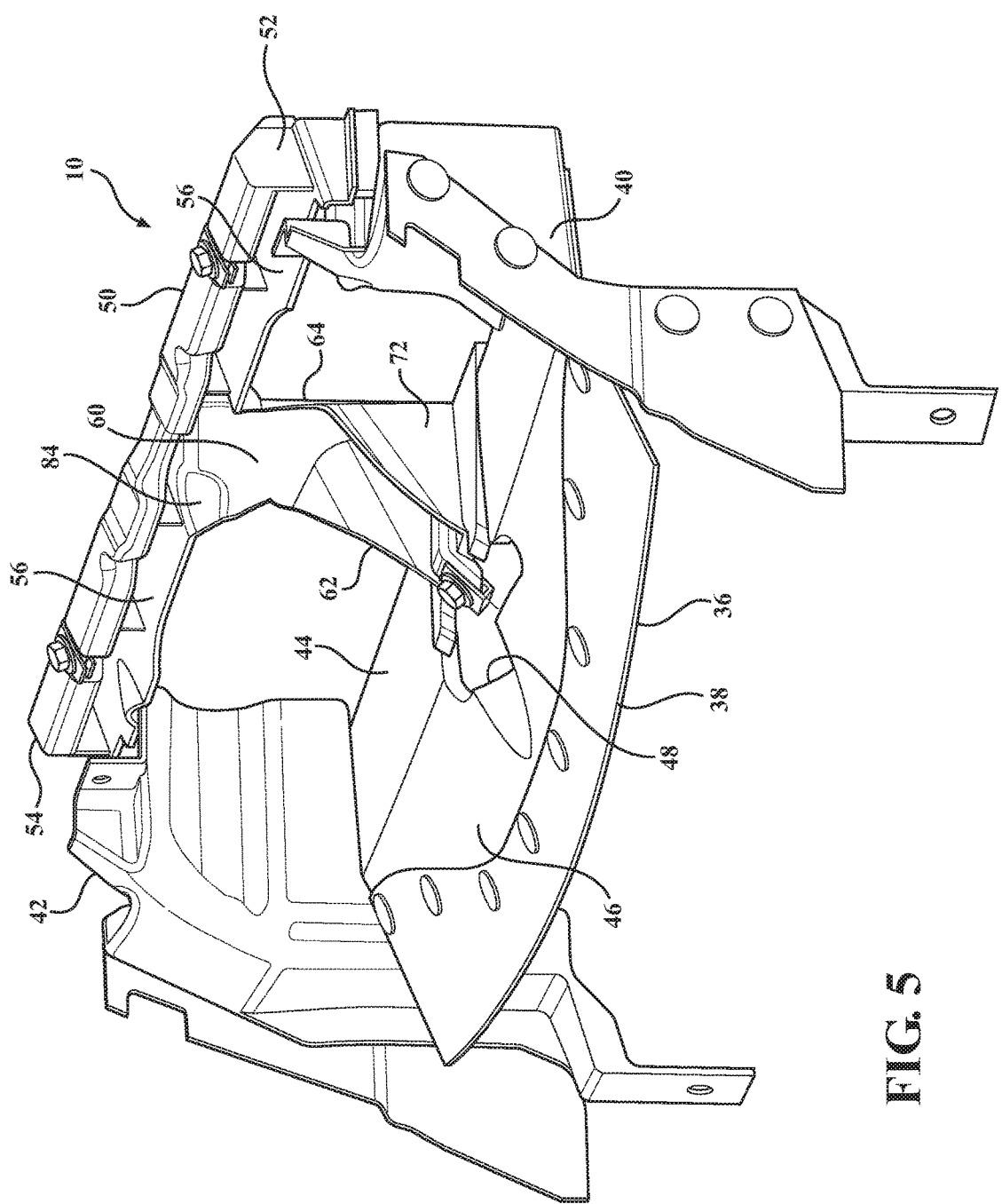
FIG. 5 is a perspective view of the baffle assembly illustrating the air diverter integral with the upper baffle and extending from a front end to be disposed adjacent the hood latch support bracket to a back end to be disposed adjacent the charge air cooler.
Figure 7:
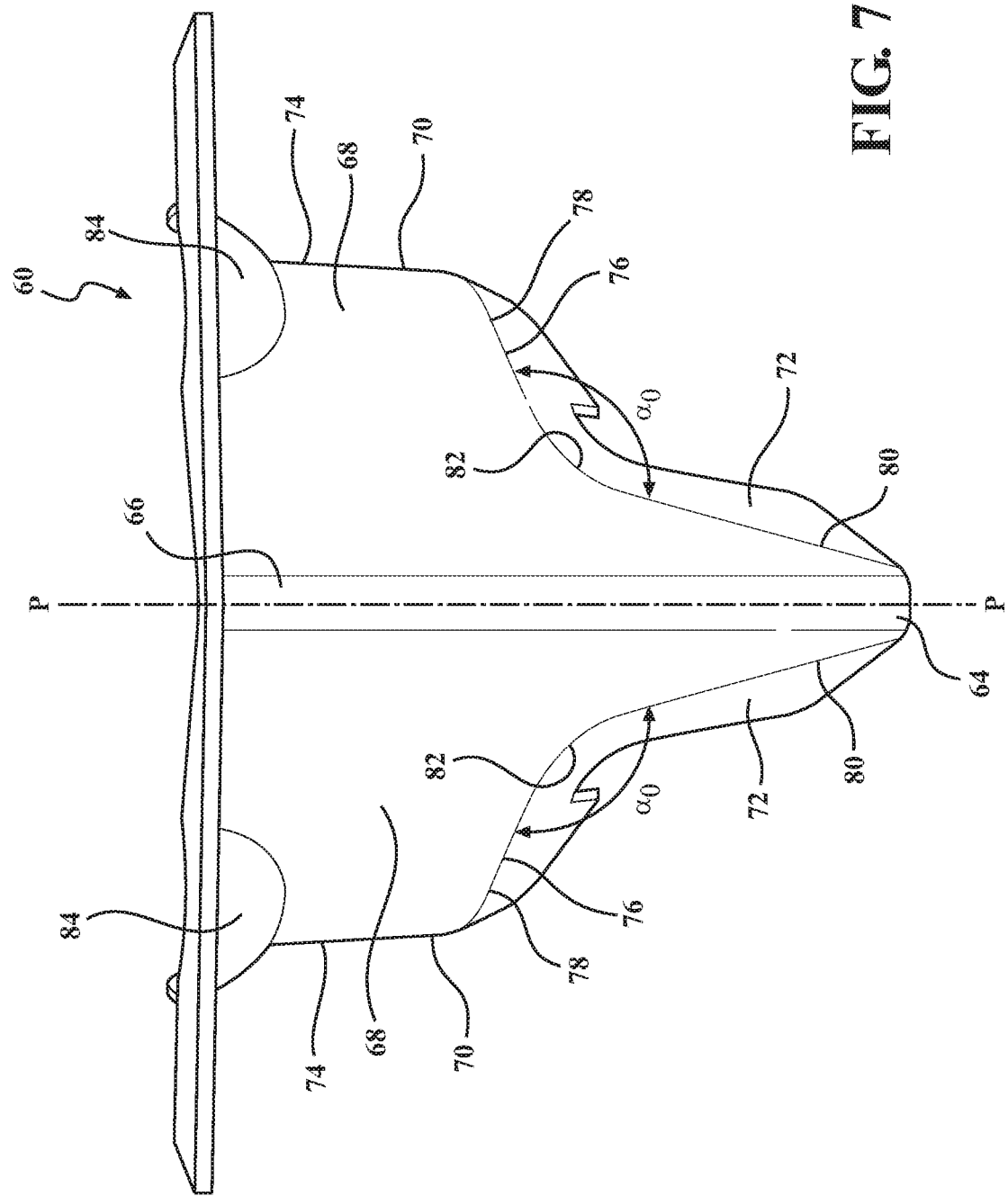
FIG. 7 is a rear view of the air diverter illustrating an obtuse angle between the first and second linear portions of the leading edges of the first pair of converging surfaces.

As best illustrated in FIGS. 1 and 2, the baffle assembly 10 includes a lower baffle 36 that is mounted next adjacent the lower structure 18 of the vehicle frame to direct air upwardly towards the charge air cooler 12. The lower baffle 36 includes a lower baffle plate 38 extending along and in spaced relationship with the lower structure 18 between a first lower baffle end 40 disposed adjacent one of the side structures 22 to a second lower baffle end 42 disposed adjacent the other ones of the side structures 22. As best illustrated in FIGS. 1, 3, and 5, the lower baffle plate 38 includes a first plate portion 44 disposed adjacent and transverse to the charge air cooler 12 and a second plate portion 46 extending downwardly from the first plate portion 44 and angularly towards the lower structure 18 of the vehicle frame. Accordingly, the first and second plate portions 44, 46 collectively direct air upwardly towards the charge air cooler 12. Since the charge air cooler 12 is mounted above the radiator module 30, the first and second plate portions 44, 46 of the lower baffle plate 38 also functions to direct air downwardly towards the radiator module 30. Thus, the lower baffle 36 is effectively shared between both the charge air cooler 12 and the radiator module 30 mounted below. As further illustrated in FIGS. 1, 3, and 5, the lower baffle plate 38 also defines a notch 48 for receiving and allowing the hood latch support bracket 24 to pass there through.

The baffle assembly 10 includes an upper baffle 50 mounted along and behind the upper structure 16 of the vehicle frame 20 between a first upper baffle end 52 and a second upper baffle end 54, each disposed adjacent a respective one of the pair of side structures 22. As best illustrated in FIGS. 3-6, the upper baffle 50 includes at least one upper baffle plate 56 disposed between the first and second upper baffle ends 52, 54 to direct air downwardly towards the charge air cooler 12. The baffle assembly 10 also includes an air diverter 60 which is preferably integral with and extends downwardly from the lower baffle 36 to next adjacent or in abutting relationship with the lower baffle 36. Thus, as best illustrated in FIGS. 1, 3, and 6, the air diverter 60 is positioned behind and in overlapping relationship with the hood latch support bracket 24. However, the air diverter 60 could also extend upwardly from the lower baffle 36 without departing from the scope of the subject disclosure.

As best illustrated in FIGS. 3 and 5, the air diverter 60 extends between a front end 62 disposed adjacent the hood latch support bracket 24 and a rear end 64 disposed next adjacent the charge air cooler 12. As best illustrated in FIG. 6, the rear end 64 of the air diverter 60 includes a trailing central surface 66 which is positioned closest to the charge air cooler 12. In a preferred arrangement, the trailing central surface 66 is disposed perpendicular to a plane P extending transversely through the central trailing surface 66 for disposing the central trailing surface 66 in spaced and parallel relationship with the charge air cooler 12. The air diverter 60 includes a first pair of converging surfaces 68 that are mirror images of one another relative to the plane P and which each converge with one another from respective leading edges 70 to the trailing central surface 66. The air diverter 60 also includes a second pair of converging surfaces 72 which are mirror images of one another relative to the plane P and each converge towards one another from the front end 62 of the air diverter 60 to the leading edge 70 of the respective first converging surface 68. As will be described in more detail below, the first and second pair of converging surfaces 68, 72 effectively reduces turbulence behind the hood latch support bracket 24 and more uniformly distributes airflow to the charge air cooler 12 to increase its effectiveness.

As best illustrated in FIG. 6, each of the leading edges 70 of the first pair of converging surfaces 68 preferably includes an upper leading edge portion 74 extending downwardly from the upper baffle 50 and a convex leading edge portion 76 extending downwardly from the upper leading edge portion 74 and towards the lower baffle 36. The convex leading edge portions 76 of each of the first pair of converging surfaces 68 includes a first linear portion 78 extending inwardly from the upper leading edge portion 74 and towards the trailing central surface 66, a second linear portion 80 extending upwardly from next adjacent the lower baffle 36, and a curve 82 interconnecting the first and second linear portions 78, 80 to define an obtuse angle $\theta_O$ between the first and second linear portions 78, 80.

Figure 8:
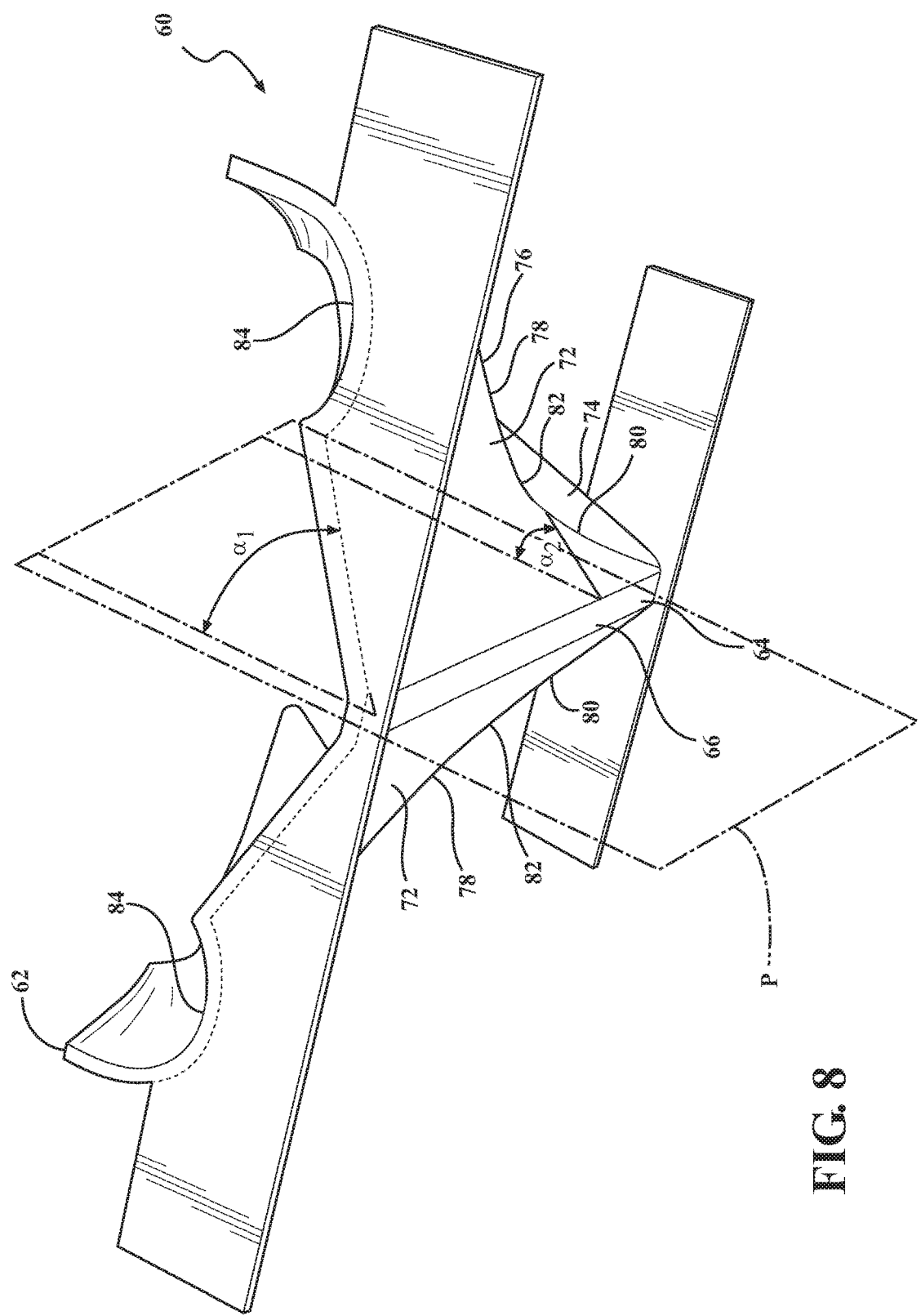
FIG. 8 is a top view of the air diverter illustrating a first converging angle of the first pair of converging surfaces and a second converging angle of the second pair of converging surfaces.

As best illustrated in FIG. 8, the first pair of converging surfaces 68 are disposed along a first converging angle $\theta_1$ defined relative to the plane P, and a portion of each of the second pair of converging surfaces 72 extending between the front end 62 and the respective second linear portions 80 are disposed along a second converging angle $\theta_2$ defined relative to the plane P. In a preferred arrangement, the first converging angle $\theta_1$ is greater than the second converging angle $\theta_2$. As best illustrated in FIG. 6, each of the first pair of converging surfaces 68 define a protrusion 84 extending outwardly towards the rear end 64 of the air diverter 60 for covering a fastener 86 of the hood latch support bracket 24 when the air diverter 60 is disposed in overlapping relationship therewith.

As described previously, when the charge air cooler 12 is mounted behind the hood latch support bracket 24, the sharp, bracket edges 28 of the hood latch support bracket 24 produces turbulence and recirculates the flow behind the hood latch support bracket 24. For example, with reference to FIG. 4, the hood latch support bracket 24 defines three different zones along a front face of the charge air cooler 12—Zone A defined by those sections of the charge air cooler 12 which are not blocked by the hood latch mounting bracket 24, Zone B defined by those sections of the charge air cooler 12 which are blocked by and extend adjacent the edges 28 of the hood latch support bracket 24, and Zone C which is central to the charge air cooler 12 and extends along an area in alignment with a center of the hood latch mounting bracket 24. In the illustrated arrangement, Zone A accounts for approximately 65% of the front face of the charge air cooler 12, Zone B accounts for approximately 20% of the front face of the charge air cooler 12, and Zone C accounts for approximately 15% of the front face of the charge air cooler 12. As evidenced by Table 1 below, the presence of the hood latch support bracket 24 restricts the air entering into the charge air cooler 12 in zones B and C relative to Zone A (which is not blocked by the hood latch mounting bracket 24). Indeed, the presence of the hood latch support bracket 24 almost completely restricts airflow in Zone C of the charge air cooler 12.

TABLE 1

Velocity along Zones A, B, and C at Various Vehicle Speeds When the Baffle Assembly Does Not Include an Air Diverter:

| Velocity KPH | Zone A - Velocity Without Air Diverter (KPH) | Zone B - Velocity Without Air Diverter (KPH) | Zone C - Velocity Without Air Diverter (KPH) | Average velocity Without Air Diverter (KPH) |
|---|---|---|---|---|
| 10 | 12 | 4 | 1 | 8.75 |
| 20 | 23 | 7 | 1 | 16.5 |
| 30 | 34 | 11 | 1 | 24.5 |
| 40 | 44 | 14 | 2 | 31.7 |
| 50 | 55 | 19 | 2 | 39.8 |

In contrast, and with reference to the following Table 2, the inclusion of the air diverter 60 in the baffle assembly 10 leads to an improvement in the airflow entering Zones B and C, and most significantly in Zone C which provides up to a 2000% improvement in air velocity at higher vehicle speeds. Indeed, the air diverter 60 even provides up to a 30% improvement in overall average air velocity passing through the entire front face of the charge air cooler 12 when the vehicle is traveling at 50 KPH. Thus, the test data establishes that the air diverter 60 moderates a wake or turbulence typically produced behind the hood latch support bracket 24 and diverts the airflow behind the hood latch support bracket 24 to more uniformly distribute airflow to the charge air cooler 12, particularly with regard to Zone C which is centrally blocked by the hood latch support bracket 24. Thus, as supported by the air velocity Tables 1 and 2, the air diverter 60 advantageously provides the charge air cooler 12 with an optimum cold air feed that significantly improves the effectiveness of the charge air cooler 12.

TABLE 2

Velocity along Zones A, B, and C at Various Vehicle Speeds When the Baffle Assembly Includes an Air Diverter:

| Velocity KPH | Zone A - Velocity With Air Diverter (KPH) | Zone B - Velocity With Air Diverter (KPH) | Zone C - Velocity With Air Diverter (KPH) | Average Aelocity With Air Diverter (KPH) | Improvement |
|---|---|---|---|---|---|
| 10 | 12 | 4 | 2 | 8.9 | 2% |
| 20 | 22 | 16 | 11 | 19.15 | 16% |
| 30 | 32 | 25 | 17 | 28.4 | 16% |
| 40 | 44 | 33 | 21 | 38.4 | 20% |
| 50 | 55 | 48 | 41 | 51.5 | 29% |

As is well known in the art, an increased velocity of air transfer to the charge air cooler 12 improves an ambient air mass flow rate through the charge air cooler 12, which correspondingly leads to a decrease in the temperature of the gas flowing through and out of the charge air cooler 12 to the engine. Thus, as illustrated by the following Table 3, the air diverter 60 provides an improvement in the ambient air mass flow through the charge air cooler 12 at all speeds relative to a baffle assembly that does not include the air diverter 60.

TABLE 3

Charge Air Cooler ("CAC") Cold Air Flow Comparison With &
Without an Air Deflector at Various Vehicle Speeds:

| Vehicle Speed (KPH) | Vehicle Speed (m/s) | Cold Air Mass Flow Thru CAC with Air Diverter (Kg/sec) | Cold Air Mass Flow Thru CAC without Air Diverter (Kg/sec) | Δ Increase Cold Air Thru CAC (Kg/sec) | Improvement |
|---|---|---|---|---|---|
| 15.5 | 4.305559 | 0.008520 | 0.006754 | 0.001765 | 26% |
| 31 | 8.611118 | 0.036104 | 0.033155 | 0.002949 | 9% |
| 39 | 10.833342 | 0.050355 | 0.041665 | 0.008690 | 21% |
| 87 | 24.166686 | 0.188940 | 0.175410 | 0.013530 | 8% |
| 104 | 28.888912 | 0.246530 | 0.217770 | 0.028760 | 13% |
| 126 | 35.000028 | 0.320980 | 0.290080 | 0.030900 | 11% |
| 171 | 47.500038 | 0.490300 | 0.433440 | 0.056860 | 13% |

Accordingly, the air diverter 60 advantageously obtains up to approximately 10-20% higher cold air high mass flow rate through the charge air cooler 12, which advantageously results in an increase of its effectiveness.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed:

1. A baffle assembly for directing air to a charge air cooler disposed within a engine compartment defined by an upper structure and a lower structure of a vehicle frame and mounted above a radiator module and behind a hood latch support bracket extending between the upper and lower structures, said baffle assembly comprising:
    a lower baffle for mounting along and next adjacent the lower structure of the vehicle frame to direct air upwardly towards the charge air cooler;
    an upper baffle for mounting along and behind the upper structure of the vehicle frame to direct air downwardly towards the charge air cooler; and
    an air diverter extending from one of said lower or upper baffles and including a front end for positioning behind the hood latch support bracket and a rear end to be disposed next adjacent the charge air cooler to reduce turbulence behind the hood latch support bracket and more uniformly distribute airflow to the charge air cooler; and
    said rear end of said air diverter including a trailing central surface for positioning closest to the charge air cooler and a first pair of converging surfaces disposed opposite one another relative to a plane P defined transverse to said trailing central surface and converging with one another from respective leading edges to said trailing central surface.

2. A baffle assembly as set forth in claim 1, wherein said air diverter extends between said lower and upper baffles.

3. A baffle assembly as set forth in claim 1, wherein said air diverter extends from and is integral with said upper baffle.

4. A baffle assembly as set forth in claim 1, wherein said first pair of converging surfaces being mirror images of one another relative to the plane P defined transverse to said trailing central surface.

5. A baffle assembly as set forth in claim 4, wherein said air diverter includes a second pair of converging surfaces being mirror images of one another relative to said plane P and converging towards one another from said front end of said air diverter to said respective leading edge.

6. A baffle assembly as set forth in claim 5, wherein each of said leading edges of said first pair of converging surfaces includes an upper leading edge portion extending downwardly from said upper baffle and a convex leading edge portion extending from said upper leading edge portion towards said lower baffle.

7. A baffle assembly as set forth in claim 6, wherein said convex leading edge portions of each of said first pair of converging surfaces includes a first linear portion extending inwardly from said upper leading edge portion and towards said trailing central surface, a second linear portion extending upwardly from next adjacent said lower baffle, and a curve interconnecting said first and second linear portions to define an obtuse angle between said first and second linear portions.

8. A baffle assembly as set forth in claim 7, further comprising:
    said first pair of converging surfaces disposed along a first converging angle defined relative to said plane P;
    a portion of each of said second pair of converging surfaces extending between said front end and said respective second linear portions disposed along a second converging angle defined relative to said plane P; and
    said first converging angle being greater than said second converging angle.

9. A baffle assembly as set forth in claim 4, wherein each of said first pair of converging surfaces define a protrusion extending outwardly towards said rear end of said air diverter for covering a fastener of the hood latch support bracket.

10. A baffle assembly as set forth in claim 1, wherein said trailing central surface extends perpendicularly relative to said plane P for being disposed in spaced and parallel relationship to the charge air cooler.

11. A baffle assembly for directing air to a charge air cooler disposed within a vehicle engine compartment defined at least partially by an upper structure of a vehicle frame and mounted above a radiator module and behind a hood latch support bracket attached to and extending downwardly from the upper structure, the baffle assembly comprising:
    an upper baffle for mounting along and behind the upper structure of the vehicle frame to direct air downwardly towards the charge air cooler;

an air diverter extending downwardly from said upper baffle and including a front end for positioning behind the hood latch support bracket and a rear end to be disposed next adjacent the charge air cooler to reduce turbulence behind the hood latch support bracket and more uniformly distribute airflow to the charge air cooler; and said rear end of said air diverter including a trailing central surface for positioning closest to the charge air cooler and a first pair of converging surfaces disposed opposite one another relative to a plane P defined transverse to said trailing central surface and converging with one another from respective leading edges to said trailing central surface.

12. A baffle assembly as set forth in claim 11, wherein said air diverter is integral with said upper baffle.

13. A baffle assembly as set forth in claim 11, wherein said first pair of converging surfaces being mirror images of one another relative to the plane P defined transverse to said trailing central surface.

14. A baffle assembly as set forth in claim 13, wherein said air diverter includes a second pair of converging surfaces being mirror images of one another relative to said plane P and converging towards one another from said front end of said air diverter to said respective leading edge.

15. A baffle assembly as set forth in claim 14, wherein each of said leading edges of said first pair of converging surfaces includes an upper leading edge portion extending downwardly from said upper baffle and a convex leading edge portion extending downwardly from said upper leading edge portion.

16. A baffle assembly as set forth in claim 15, wherein said convex leading edge portions of each of said first pair of converging surfaces includes a first linear portion extending inwardly from said upper leading edge portion and towards said trailing central surface, a second linear portion extending upwardly from next adjacent said central trailing surface, and a curve interconnecting said first and second linear portions to define an obtuse angle between said first and second linear portions.

17. A baffle assembly as set forth in claim 16, further comprising:
said first pair of converging surfaces disposed along a first converging angle defined relative to said plane P;
a portion of each of said second pair of converging surfaces disposed between said front end and said respective second linear portions extending along a second converging angle defined relative to said plane P; and
said first converging angle being greater than said second converging angle.

18. A baffle assembly as set forth in claim 11, wherein said trailing central surface extends perpendicularly relative to said plane P for being disposed in spaced and parallel relationship to the charge air cooler.

* * * * *